US008307729B2

(12) United States Patent
Chazotte

(10) Patent No.: US 8,307,729 B2
(45) Date of Patent: Nov. 13, 2012

(54) DUAL CLUTCH TRANSMISSION WITH MODIFIABLE GEAR SPEEDS AND USE OF THE TRANSMISSION FOR AT LEAST TWO TRANSMISSION VARIATIONS

(75) Inventor: Jean-Pierre Chazotte, Frechen (DE)

(73) Assignee: Getrag Ford Transmissions GmbH, Cologne, DE (US)

(*) Notice: Subject to any disclaimer, the term of this patent is extended or adjusted under 35 U.S.C. 154(b) by 600 days.

(21) Appl. No.: 12/267,213

(22) Filed: Nov. 7, 2008

(65) Prior Publication Data

US 2009/0120221 A1 May 14, 2009

(30) Foreign Application Priority Data

Nov. 14, 2007 (EP) .................................... 07120719

(51) Int. Cl.
*F16H 3/08* (2006.01)

(52) U.S. Cl. ........................................................ 74/331

(58) Field of Classification Search .................... 74/330, 74/331, 340; 29/401.1
See application file for complete search history.

(56) References Cited

U.S. PATENT DOCUMENTS

| | | | | |
|---|---|---|---|---|
| 4,602,519 A * | 7/1986 | Atkins et al. | 74/375 |
| 4,704,777 A * | 11/1987 | Schaefer et al. | 29/891 |
| 4,922,599 A * | 5/1990 | Durfee | 29/401.1 |
| 7,155,994 B2 * | 1/2007 | Gumpoltsberger | 74/340 |
| 7,485,063 B2 * | 2/2009 | Nett et al. | 475/223 |
| 7,640,818 B2 * | 1/2010 | Carey et al. | 74/330 |
| 7,669,497 B2 * | 3/2010 | Borgerson et al. | 74/340 |
| 7,703,346 B2 * | 4/2010 | Hendrickson et al. | 74/331 |
| 7,748,286 B2 * | 7/2010 | Baldwin | 74/330 |
| 7,752,934 B2 * | 7/2010 | Singh et al. | 74/331 |
| 7,870,804 B2 * | 1/2011 | Bjorck et al. | 74/331 |
| 2007/0199393 A1 * | 8/2007 | Hattori | 74/331 |
| 2008/0202267 A1 * | 8/2008 | Hendrickson et al. | 74/331 |

FOREIGN PATENT DOCUMENTS

| | | |
|---|---|---|
| DE | 10 2004 012 909 | 10/2005 |
| EP | 1 424 509 | 6/2004 |
| EP | 1 826 457 | 8/2007 |
| EP | 2060827 | 5/2009 |

* cited by examiner

*Primary Examiner* — Roger Pang
(74) *Attorney, Agent, or Firm* — Schlee IP International, P.C.; Alexander R. Schlee

(57) ABSTRACT

A modifiable dual clutch transmission is suggested allowing to be manufactured as two transmission variations having an interdependence of fixed wheels and loose wheels that remains at the same position for both variations while the loose wheels belonging to this interdependence are provided with different diameters for providing different transmission ratios. At least one of the loose wheels in that interdependence is correlated to a different forward gear in one transmission variation compared to the other transmission variation. In both transmission variations the loose wheels relating to the respective interdependences are correlated only to even numbered forward gears or to odd numbered forward gears, preserving the advantage of the dual clutch transmission to shift between two adjacent forward gears without interruption in the tractive power.

4 Claims, 1 Drawing Sheet

62
61
R
60
33
34
36
VII
V
VI
37
31
32
35
30
12
13
21
22
20
11
10
42
41
40
45
P
I
III
IV
II
50
46
43
44
47

62
61
R
60
33
34
36
III
VII
VI
31
32
30
12
20
11
10
42
41
40
45
47
P
I
V
IV
II
50
46
43
44

DUAL CLUTCH TRANSMISSION WITH MODIFIABLE GEAR SPEEDS AND USE OF THE TRANSMISSION FOR AT LEAST TWO TRANSMISSION VARIATIONS

CROSS REFERENCE TO RELATED APPLICATION

This application claims the priority right from the European patent application EP 07120719.5 that was filed on Nov. 14, 2007, the content of which is herewith incorporated in its entirety by reference.

BACKGROUND OF THE INVENTION

The invention relates to a dual clutch transmission with modifiable gear speeds and use of the transmission for at least two transmission variations.

From the DE 10 2004 012 909 A1 a dual clutch transmission is known comprising a first group of fixed wheels and a second input shaft with a second group of fixed wheels. The fixed wheels are engaged by loose wheels that are provided on a first intermediate shaft or a second intermediate shaft, respectively. Each loose wheel that is engaged by a fixed wheel from the first group of fixed wheels can be assigned to an odd numbered forward gear I, III, V, VII. Accordingly, each loose wheel that is engaged by a fixed wheel from the second group of fixed wheels can be assigned to an even numbered forward gear II, IV, VI.

By means of gear shift clutches, the individual loose wheels can be connected in a non-rotatable manner with the respective intermediate shaft. Therefore, a torque flow from one of the input shafts via the fixed wheel and a loose wheel that is engaged by the fixed wheel to one of the intermediate shafts is possible, wherein for the torque transmission to the intermediate shaft the loose wheel is activated by means of a corresponding gear shift clutch.

The dual clutch transmission according to the DE 10 2004 012 909 A1 comprises two so-called interdependences. One interdependence is established when two loose wheels are engaged by one and the same fixed wheels. While one interdependence is established by means of the loose wheels of a fifth forward gear or a seven forward gear, respectively, with the respective fixed wheel, the other interdependence is created by the loose wheels of a fourth forward gear IV or a sixth forward gear VI, respectively.

By providing one or more interdependences dual clutch transmissions having a low axial size can be designed, that being preferred in motor vehicles with combustion engines that are disposed in a transverse direction. One disadvantage of this interdependence is that with changing the transmission ratio of one forward gear, also the transmission ratio of the other forward gear that is established by the other loose wheel of the same interdependence is changed. This makes it difficult to adapt a dual clutch transmission that has been optimized with regard to the transmission gaps to a particular combustion engine in a motor vehicle to a different combustion engine with a different rotational speed characteristic or a different range of the rotational speeds in the optimal manner. This might result in substantial modifications of the design of the dual clutch transmission and therefore result in high costs.

SUMMARY OF THE INVENTION

It is an object of the invention to enhance the dual clutch transmission such that different transmission variations with different transmission ratio increments are possible, wherein the different designs of the transmission variations should deviate as little as possible for each other.

According to the invention, the dual clutch transmission for motor vehicles with modifiable gear speed, modifiable to at least two transmission variations comprising substantially the same design but different transmission ratio increments, wherein the dual clutch transmission comprises:

- a first input shaft with a first group of fixed wheels;
- a second input shaft with a second group of fixed wheels; and
- a first intermediate shaft as well as a second intermediate shaft provided with loose wheels thereon; wherein
- the loose wheels provided on the intermediate shafts are engaged by correlating fixed wheels that are provided on the input shafts;
- a loose wheel that is engaged by a fixed wheel from the first group of fixed wheels is assigned to an odd numbered forward gear;
- a loose wheel that is engaged by a fixed wheel from the second group of fixed wheels is assigned to an even numbered forward gear;
- at least two loose wheels are engaged by one and the same fixed wheel from the first group or the second group of fixed wheels, wherein an interdependence is created; and
- the loose wheels can be switched by gear shift clutches such as to be connected in a non-rotatable manner with the first or the second intermediate shaft.

According to the invention, for two transmission variations of the dual clutch transmission the interdependence remains at the same position while the loose wheels belonging to this interdependence are provided with different diameters for providing different transmission ratios, wherein at least one of the loose wheels in that interdependence is correlated to a different forward gear in one transmission variation compared to the other transmission variation, and wherein in both transmission variations the loose wheels relating to the respective interdependences are correlated only to even numbered forward gears or to odd numbered forward gears. This preserves the advantage of a dual clutch transmission, namely to shift between two adjacent forward gears without interruption in the tractive power.

The use according to the invention of a dual clutch transmission for motor vehicles for at least two transmission variations comprising different transmission ratio increments comprises the use steps of:

- maintaining for the two transmission variations the interdependence at the same position;
- providing for this interdependence loose wheels having different diameters for providing different transmission ratios,
- correlating at least one of the loose wheels in that interdependence to a different forward gear in one transmission variation compared to the other transmission variation; and
- correlating in both transmission variations the loose wheels relating to the respective interdependences only to even numbered forward gears or to odd numbered forward gears.

According to a preferred embodiment one transmission variation comprises an interdependence with loose wheels correlating to a third forward gear and a fifth forward gear, respectively, while another transmission variation comprises an interdependence with loose wheels correlating to a fifth forward gear and a seventh forward gear, respectively. This embodiment does therefore only relate to odd numbered gears. However, in the alternative, it is also possible that the interdependence correlates to even numbered gears. For example, one transmission variation may comprise an interdependence with loose wheels correlating to the second forward gear and the fourth forward gear, respectively, while another transmission variation may comprise an interdependence with loose wheels correlating to the fourth and the sixth forward gears, respectively. For loose wheels of different sizes the diameters of the fixed wheels engaging the loose wheels have to be adjusted accordingly, since for both transmission variations the disposition of the transmission shafts (the two input shafts and the two intermediate shafts) remain the same and will not be changed.

The general design of the gear wheels that are exchanged (loose wheels, fixed wheels) remains the same since the gear wheels only receive different teeth with different rolling circle diameter while the general dimensions such as bore diameter, length, position and fixing on the shafts, shifting teeth etc. will not be changed. All other substantial parts of the transmission such as transmission shafts, the housing, and the gear shift clutches are identical for both transmission variations or almost identical. Only the actuating assembly switching of the respective gear shift clutches has to be adjusted to the different disposition of the forward gears in the two transmission variations. In a dual clutch transmission shifted in an automated manner by shifting actuators this adjustment can, however, be achieved with very little effort.

For implementing a reverse gear an intermediate shaft can be provided carrying at least one fixed wheel that is engaged by a fixed wheel provided on one of the two input shafts and with a loose wheel on the first or the second intermediate shaft. The loose wheel that is engaged by a fixed wheel provided on the intermediate shaft can be connected in similar fashion as the loose wheel of the forward gears by means of a gear shift clutch in a non-rotatable manner with the respective intermediate shaft so that a torque is transmitted from the first and the second input shaft via the intermediate shaft to the respective intermediate shaft.

Both transmission variations comprise preferably seven forward gears. Also further forward gears can be provided. For example, a dual clutch transmission may comprise eight forward gears.

In addition to the interdependence as described above also further interdependences with additional loose wheels may be provided correlating only to even numbered or odd numbered forward gears, respectively. A first interdependence with loose wheels of odd numbered forward gears and a second interdependence with loose wheels of even numbered forward gears may be provided. The loose wheels provided in the additional interdependence can for example be correlated to a fourth and a sixth forward gear, respectively. In case of a transmission with eight forward gears, the loose wheels of the second interdependence can also correlate to the sixth forward gear and an eighth forward gear.

In addition, an embodiment is possible where one transmission variation comprises an interdependence with loose wheels correlating to the fourth and the sixth forward gear, while the other transmission variation comprises an interdependence with loose wheels correlating to the sixth forward gear and the eighth forward gear, respectively.

In the transmission variations as described in the paragraph above, also a further interdependence with loose wheels correlating to the third forward gear and the fifth forward gear, respectively, can be provided. The further interdependence can in the alternative comprise loose wheels that are correlated to the fifth and the seven forward gears, respectively.

BRIEF DESCRIPTION OF THE DRAWINGS

Further advantageous embodiments of the invention can be gathered from the drawings. In the drawings show.

DETAILED DESCRIPTION OF THE DRAWINGS

Figure 1:
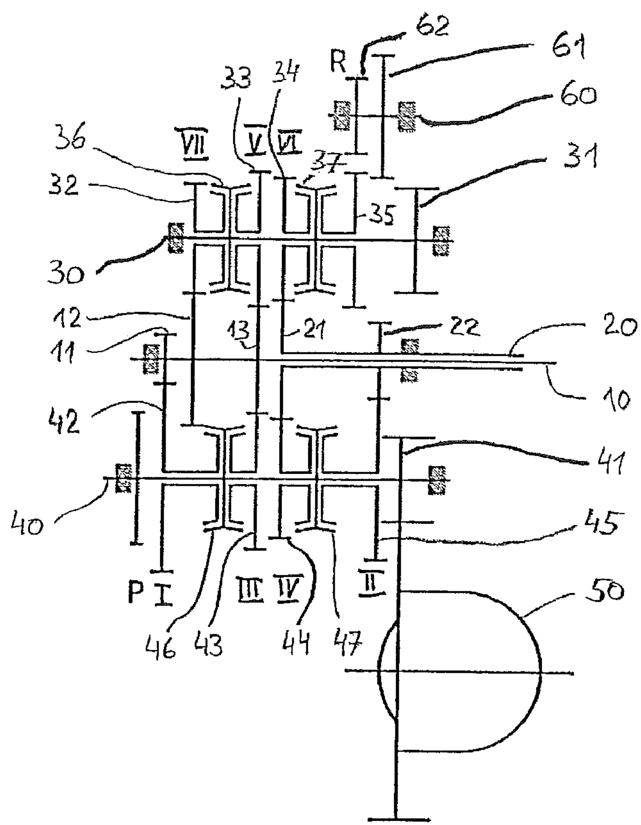
FIG. 1 a schematic illustration of the dual clutch transmission according to the invention.
Figure 2:
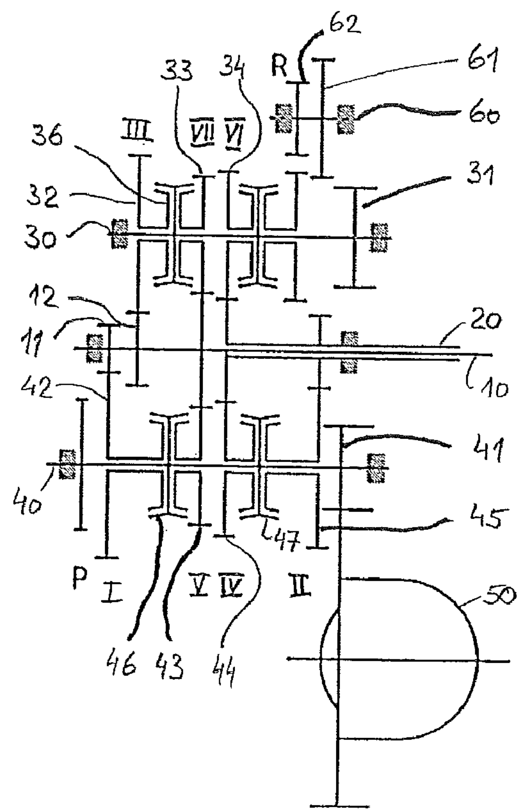
FIG. 2 a schematic illustration of the dual clutch transmission according to the invention with a modified disposition of the forward gears.

FIGS. 1 and 2 show two variations of the dual clutch transmission according to the present invention, each having seven forward gears I to VII and one reverse gear R that has been shown schematically. The following discussion relates at first only to the transmission variation shown in FIG. 1, but also applies apart from minor deviations that will be explained below also to the transmission variation shown in FIG. 2. Therefore, identical parts and features in FIG. 2 that are identical to the parts and features in FIG. 1 are denoted with the same reference numerals.

The dual clutch transmission in FIG. 1 comprises a first input shaft 10 and a second input shaft 20. The first input shaft 10 is designed as a solid shaft, while the second input shaft 20 is a hollow shaft that is disposed coaxially in relation to the first input shaft 10. Therefore, the input shafts 10, 20 comprise a common axis of rotation. Extending in parallel to the first input shaft 10 and the second input shaft a first intermediate shaft 30 and a second intermediate shaft 40 are provided. The first intermediate shaft 30 is connected to the power output 50 designed as a differential via a gear 31 that is fixed in a non-rotatable manner on the second intermediate shaft 30. Accordingly, the second intermediate shaft 14 carries a gear 41 that is likewise coupled with the power output 50. A dual clutch comprising two single clutches is not shown in FIG. 1.

On the first input shaft 10 fixed gear wheels 11, 12, 13 are disposed in a non-rotatable manner on the first input shaft 10, and are engaged with the loose wheels 32, 33, 42 and 43. The fixed wheel 11 being supported on the first input shaft 10 is engaged by the loose wheel 42 that is provided on the second intermediate shaft 40. The fixed wheel 12 is engaged by the loose wheel 32 that is provided on the first intermediate shaft 30. The fixed wheel 13 is engaged by the loose wheel 33 on the first intermediate shaft as well as by the loose wheel 43 on the second intermediate shaft 40. The gear wheels (loose wheels, fixed wheels) 13, 33, 43 therefore provide a first interdependence.

The second input shaft 20 carries two fixed wheels 21, 22 that are engaged by the loose wheels 34, 44 and 45. The fixed wheel 21 is simultaneously engaged by the loose wheels 34 and 44, providing a second interdependence. The fixed wheel 22 is engaged by the loose wheel 45 and a fixed wheel 61 that is provided on an intermediate shaft 60 in a non-rotatable manner with respect to that intermediate shaft 60. The intermediate shaft 60 carries another fixed wheel 62 that is engaged by the loose wheel 35 that is provided on the first intermediate shaft 30. This creates a third interdependence, comprising the loose wheel 22 and the loose wheels 45, 35 including the loose wheels 61, 62 on the intermediate shaft 60.

The forward gear I is assigned to the loose wheel 42. This first forward gear I is engaged when the gear shifting clutch 46 is activated such that it connects the loose wheel 42 in a non-rotatable manner to the second intermediate shaft 40. In this case, the dual clutch transmission can transmit a torque from the first input shaft 10 via the fixed wheel 11, via the loose wheel 42 and the second intermediate shaft 40, wherein finally the torque reaches via the gear wheel 41 the power output 50. In a different shifting position, the gear shift transmission 46 connects the loose wheel 43 in a non-rotatable manner with the second intermediate shaft 40 such that the gears 13, 43 that are engaged with each other provide a torque flow from the first input shaft 10 via the second input shaft 40 to the power output 50. In this case, the third forward gear III is engaged.

Besides the gear shifting clutch 46 the dual clutch transmission comprises further gear shifting clutches 36, 37 and 47 connecting in analogy to the gear shifting clutch 46 two loose wheels, respectively, in a non-rotatable manner with the first intermediate shaft 30 or the second intermediate shaft 40. Each of the loose wheels 32, 33, 34, 35, 42, 43, 44, 45 can therefore be assigned to one of the forward gears I-VII or the reverse gear R. For example, if via the gear shifting clutch 37 the loose wheel 35 is connected to the first intermediate shaft 30 in a non-rotatable manner, the reverse gear R is engaged. In this case, the torque flow is established from the second intermediate shaft 20 via the intermediate shaft 60 and the first intermediate shaft 30 to the power output 50, wherein providing the intermediate shaft 60 in between provides the required reversing of the rotational direction in the dual clutch transmission.

As shown in FIG. 1, it is possible to assign the third forward gear III and fifth forward gear V to the first interdependence comprising the gear wheels 13, 33, 43. The second interdependence (comprised of fixed wheel 21 and the loose wheels 34, 44) can be assigned to the fourth forward gear IV and the sixth forward gear VI.

By choosing the active diameters of the gear wheels the transmission rates in the gears of the dual clutch transmission are determined. Therefore, the dual clutch transmission can be adjusted to the torque characteristic of a combustion engine in an optimized manner.

If the dual clutch transmission should be operated with a different combustion engine (for example with a gasoline powered Ottomotor instead of a diesel motor) the general design of the transmission can be maintained according to the invention, and only individual gear wheels have to be exchanged for providing different transmission rates or transmission rate gaps. All other elements of the dual clutch transmission can remain without any changes.

The transmission variation according to FIG. 1 distinguishes from the transmission variation according to FIG. 1 only by disposition of the forward gears III, V and VII. In contrast to the transmission variation according to FIG. 1 the first interdependence is created by the loose wheels of the fifth and seventh forward gears V, VII, while the third forward gear II is now assigned to the loose wheel 32 on the first intermediate shaft 30. For providing different transmission rates in the respective forward gears I to VII the diameters of the gear wheels in the transmission variations according to FIG. 2 differ from the diameters of the gear wheels in the transmission variation according to FIG. 1 at least as far as the forward gears III to VII are concerned. Therefore, the transmission variations with changed transmission rates can be provided without any bigger design efforts.

The invention claimed is:

1. A method of modifying a dual clutch transmission for motor vehicles from a first transmission variation to a second transmission variation, wherein the first and the second dual clutch transmission variations comprise:

a first input shaft with a first group of fixed wheels;

a second input shaft with a second group of fixed wheels; and a first intermediate shaft as well as a second intermediate shaft both carrying loose wheels; wherein the loose wheels provided on the intermediate shafts are engaged by correlating fixed wheels that are provided on the first and second input shafts;

a first and a second odd numbered gear loose wheel are both engaged by an odd numbered gear fixed wheel from the first group of fixed wheels creating an odd numbered forward gear interdependence wherein the first odd numbered gear loose wheel is assigned to one particular odd numbered forward gear of the motor vehicle and the second odd numbered forward gear is assigned to another particular odd numbered forward gear of the motor vehicle;

a first and a second even numbered gear loose wheel are both engaged by an even numbered gear fixed wheel from the second group of fixed wheels creating an even numbered forward gear interdependence wherein the first even numbered gear loose wheel is assigned to one particular even numbered forward gear of the motor vehicle and the second even numbered forward gear is assigned to another particular even numbered forward gear of the motor vehicle; and the loose wheels can be switched by gear shifting clutches such as to be connected in a non-rotatable manner with the first or the second intermediate shaft to co-rotate with the respective first or second intermediate shaft;

said method comprising the steps of:

maintaining for the two transmission variations both the odd numbered forward gear interdependence and the even numbered forward gear interdependence at the same position;

changing either one of the odd and even numbered forward gear interdependences by exchanging the loose wheels and the fixed wheel of that changed interdependence by substituting the loose wheels and the fixed wheel by exchange loose wheels and an exchange fixed wheel for providing different transmission ratios, wherein the exchange loose wheel and the exchange fixed wheel are in comparison to the exchanged loose wheel and exchanged fixed wheels provided with different teeth with different rolling circle diameter but are of the same general dimensions comprising bore diameter, length, position on the shaft, fixing on the shaft, and shifting teeth; and wherein further identical transmission shafts, and gear shift clutches are maintained;

after exchanging, correlating in the so created second transmission variation the loose wheels in that interdependence to different forward gears of the motor vehicle compared to the first transmission variation.

2. The method of claim 1, further comprising correlating in the first transmission variation the loose wheels of the odd numbered forward gear interdependence to a third forward gear and a fifth forward gear of the motor vehicle and in the second transmission variation to a fifth forward gear and a seventh forward gear of the motor vehicle.

3. The method of claim 1, further comprising providing both transmission variations with seven forward gears.

4. The method according to claim 1, further comprising correlating the loose wheels of the even numbered forward gear interdependence to a fourth forward gear and a sixth forward gear of the motor vehicle.

* * * * *